April 15, 1969     G. A. TINNERMAN     3,438,169

MID-SPAN DECK WEDGE LOCK

Filed May 22, 1967

INVENTOR
GEORGE A. TINNERMAN

BY Revere B. Curley

ATTORNEY

United States Patent Office 3,438,169
Patented Apr. 15, 1969

3,438,169
MID-SPAN DECK WEDGE LOCK
George A. Tinnerman, 17864 Beach Road,
Lakewood, Ohio 44107
Filed May 22, 1967, Ser. No. 640,216
Int. Cl. E04b 1/40; E04c 5/12; E04d 1/34
U.S. Cl. 52—712      4 Claims

ABSTRACT OF THE DISCLOSURE

The deck wedge lock is formed of two parallel plate-like members of hardened, resilient material having toothed elements on their opposite ends to engage the walls of the channel in channel deck panels. These plate-like members are connected by a longitudinal member to form a unitary member, the end of the plate-like members having the toothed elements being flared or inclined to increase the engaging effect of the teeth when the members are driven into the channel. A tool with a broad shoulder near its end can be passed through an opening in one plate-like member to engage the other, with a shoulder also engaging the first member. The plate members are then driven into place in the channel simultaneously. Converging fingers on opposite sides of the opening engage the tool frictionally to retain the wedge lock before insertion in the channel.

SUMMARY OF INVENTION

When channel panel members are used to form a deck or roof, the span between supporting girders may be considerable, so that the overlapping panels between the girders may have considerable movement under any forces to which the deck may be subjected. The present practice is to weld these panels together at points between the girders, sometimes resulting in holes through the panels, the removal of coating on the panel causing corrosion, and requiring painting over the welds.

Applicant has devised a toothed, resilient member which may be driven in the channel where the panels overlap and prevent any relative movement.

This wedge lock member is formed of two plate-like members having teeth on their ends, which flare or slope outwardly, so that when the members are driven into the channel, the teeth will engage in the walls. A tool passes through an opening in one member to engage the other member and has a shoulder to abut the first member so both plate-like members may be driven into the channel.

THE DRAWINGS

DESCRIPTION OF INVENTION

Figure 1:
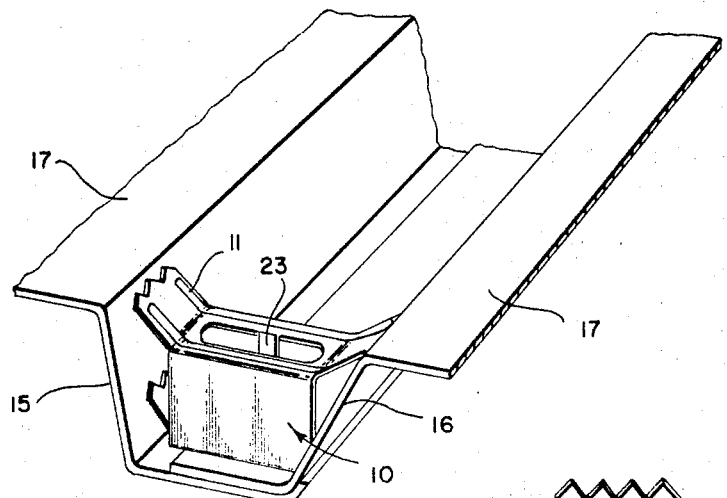
FIGURE 1 is a perspective of the deck wedge lock in place in a channel formed by overlapping channel members.
Figure 4:
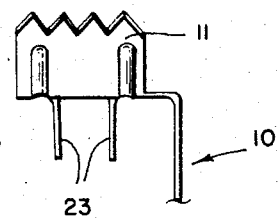
FIGURE 4 is a fragmentary cross section of the plate-like member with the aperture and tool engaging fingers.
Figures 2, 3:
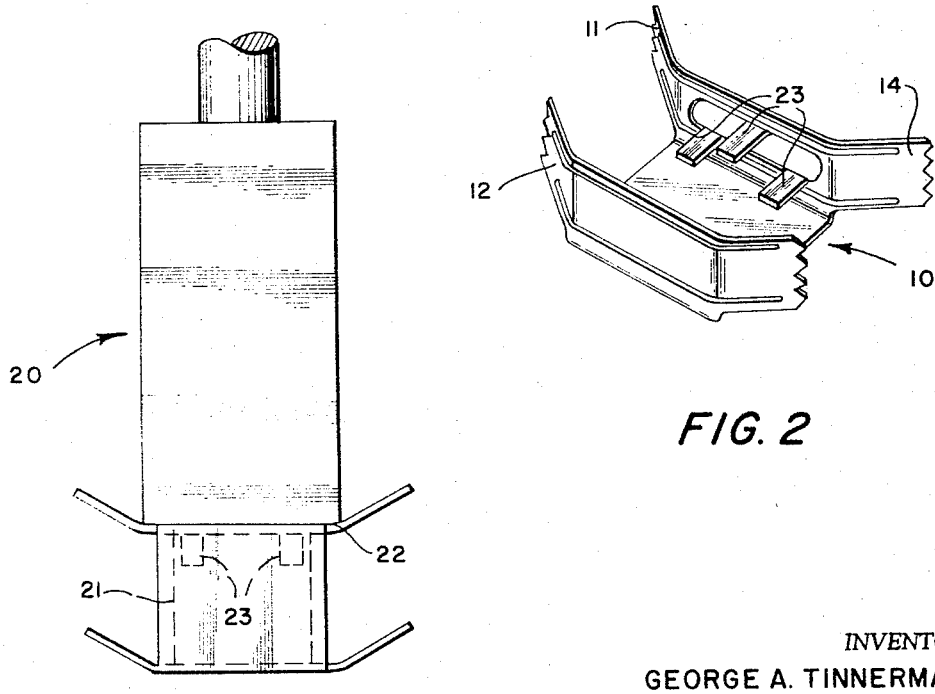
FIGURE 2 is a perspective view of the deck wedge lock.
FIGURE 3 is a view in section of the deck wedge lock with the applying tool in position in elevation.

The wedge lock member 10 is formed of two plate-like members 11, 12 integrally connected by a longitudinal member 13. On opposite ends of plate-like members 11, 12, teeth 14 are formed which engage in the walls 15, 16 the channel of panels 17, 18. The plate-like member 12 as shown in shorter than member 11, to engage in the bottom of a channel having sloping walls. The ends of members 11, 12 carry teeth 14, and are bent or inclined in a longitudinal direction from the shorter to the longer plate-like member.

The wedge lock member must be positioned in the channel with the plate-like member 12 toward the bottom of the channel, and then forced or driven in to engage the teeth 14 with the walls of the channel. For this purpose, an opening 19 is formed in the plate-like member 11 to receive a tool 20. This tool has an end 21 smaller than opening 19 and the same length as the distance between members 11 and 12, and a shoulder 22 wider than opening 19. This tool is inserted in the wedge deck member with the end 21 engaging plate-like member 12 and the shoulder 22 engaging plate-like member 11. The two members 11 and 12 are then driven into the channel simultaneously, the toothed elements 14 engaging the channel walls and preventing relative movement of the panels.

On opposite sides of opening 19 fingers or tabs 23 formed on member 11 converge slightly so they can grip the tool 20 and prevent separation of the wedge lock member and tool before it is inserted in place. With this arrangement, the wedge lock member 10 is slipped on the end of the tool, the member 10 is placed in the channel and driven into place by driving the tool. The entire time consumed in applying these wedge lock members is short and no damage to the panels can take place.

I claim:

1. A unitary, mid-span deck wedge lock for insertion between the channel walls of two overlapping deck panels, comprising a unitary element of resilient, hardened material having two sets of toothed engaging elements in two longitudinally spaced planes and longitudinally extending means joining said sets of elements in said two planes, the toothed elements in each plane extending transversely outwardly in opposite directions and inclined longitudinally in the same direction, so that said wedge lock may be forced between the said channel walls with each set of toothed elements engaging the opposite walls of said channel and inclined toward the walls and open side of the channel with one set adjacent the bottom of the channel and the other set nearer the open side to lock said panel members against relative movement.

2. A unitary, mid-span deck wedge lock comprising two spaced, parallel plate-like members of hardened resilient material and an integral, longitudinal member connecting said plate-like members, transversely outwardly extending toothed elements on the opposite ends of each of said plate-like members, said toothed elements being inclined from a transverse direction longitudinally in the same direction, so that said wedge lock members may be placed in the channel between the walls of overlapping channel panel members with the said toothed elements directed toward the open side of said channel and said wedge member may be forced into said channel with the outwardly extending toothed elements of one plate-like member engaging the opposite walls of the channel adjacent the overlapping bottom members, and the toothed elements of the other plate-like member may engage the walls of said channel nearer the open side to secure said wedge lock in position and maintain said channel members in fixed relation.

3. A deck wedge lock as claimed in claim 2, in which one plate-like member has an opening therein for a tool to be inserted to engage the other plate-like member and drive the two members into the channel, and converging flange elements at opposite sides of said opening to grip said tool while said wedge lock is being inserted in said channel.

4. A unitary, mid-span deck wedge lock comprising two spaced, parallel plate-like members of hardened resilient material and a longitudinal member connecting said plate-like members, transversely outwardly extending toothed elements on the opposite ends of each of said plate-like members, one of said plate-like members being of less transverse extent than the other, said toothed elements being inclined from a transverse direction longitudinally in the direction from the shorter to the longer of said members, so that when said wedge lock is forced into a channel between the walls of deck panels, the toothed elements on the shorter member will engage the walls adjacent the bottom of the channel and the toothed elements of the longer member will engage the walls nearer the open side of the channel.

References Cited

UNITED STATES PATENTS

| | | | |
|---|---|---|---|
| 2,674,354 | 4/1954 | MacLeod | 52—344 |
| 2,802,551 | 8/1957 | Roberts | 52—506 |
| 2,910,155 | 10/1959 | Bradner | 52—520 |
| 3,284,117 | 11/1966 | Meehan | 287—189.35 |
| 3,390,500 | 7/1968 | Schumak | 52—713 |

FRANK L. ABBOTT, *Primary Examiner.*

JAMES L. RIDGILL, JR., *Assistant Examiner.*

U.S. Cl. X.R.

52—520, 543, 588; 287—189.35